United States Patent
Tsujii (10) Patent No.: US 8,401,287 B2
(45) Date of Patent: Mar. 19, 2013

(54) IMAGE PROCESSING APPARATUS AND PROCESSING METHOD THEREOF

(75) Inventor: Takaya Tsujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 12/946,639

(22) Filed: Nov. 15, 2010

(65) Prior Publication Data

US 2011/0158522 A1 Jun. 30, 2011

(30) Foreign Application Priority Data

Dec. 25, 2009 (JP) ................. 2009-296378

(51) Int. Cl.
*G06K 9/36* (2006.01)

(52) U.S. Cl. .......... 382/166; 382/162; 382/132; 348/453

(58) Field of Classification Search .................. 382/162, 382/166, 167, 232, 233, 274, 299, 239, 224, 382/195; 348/453; 345/589–590, 593, 596, 345/597, 601, 604
See application file for complete search history.

(56) References Cited

U.S. PATENT DOCUMENTS

| | | | | |
|---|---|---|---|---|
| 5,805,727 A * | 9/1998 | Nakano | ........................ | 382/195 |
| 7,130,469 B2 * | 10/2006 | Adachi | ........................ | 382/224 |
| 7,689,050 B2 * | 3/2010 | Sakaue | ........................ | 382/239 |
| 2007/0189638 A1 * | 8/2007 | Ohkawa et al. | ............... | 382/299 |

FOREIGN PATENT DOCUMENTS

JP 2004-104621 4/2004

OTHER PUBLICATIONS

U.S. Appl. No. 13/023,209, filed Feb. 8, 2011. Applicant: Takaya Tsujii.

* cited by examiner

*Primary Examiner* — Ali Bayat
(74) *Attorney, Agent, or Firm* — Fitzpatrick, Cella, Harper & Scinto (57) ABSTRACT

In an image processing apparatus that processes image data in units of blocks, each block having a predetermined number of pixels, a number of pixels in the block whose pixel values are different is calculated. A predetermined pattern for the block is specified in accordance with the calculated number of pixels whose pixel values are different and the locations of the different pixels, and the image data is compressed by outputting the specified pattern and the pixel values of only the number of pixels whose pixel values are different. It is then determined whether the image data is composed of a single color based on the output pattern and the pixel values.

5 Claims, 8 Drawing Sheets

| IMAGE | |
|---|---|
| | ALL PIXELS SAME COLOR : 1 PATTERN |
| | TWO COLORS : 7 PATTERNS |
| | THREE COLORS : 6 PATTERNS |
| | ALL PIXELS DIFFERENT COLORS : 1 PATTERN |

FIG. 4

| | | 401 | | 1-2 | 1-3 | 1-4 | 2-3 | 2-4 | 3-4 | 402 |
| --- | --- | --- | --- | --- | --- | --- | --- | --- | --- | --- |
| | | 1 2 | | | | | | | | |
| | | 3 4 | | bit0 | bit1 | bit2 | bit3 | bit4 | bit5 | |

| PATTERN FLAG | IMAGE | COMPARISON RESULT | | | | | |
| --- | --- | --- | --- | --- | --- | --- | --- |
| 0 | | 1 | 1 | 1 | 1 | 1 | 1 |
| 1 | | 0 | 1 | 1 | 0 | 0 | 1 |
| 2 | | 0 | 0 | 1 | 1 | 0 | 0 |
| 3 | | 0 | 1 | 0 | 0 | 1 | 0 |
| 4 | | 0 | 0 | 0 | 1 | 1 | 1 |
| 5 | | 1 | 0 | 1 | 0 | 1 | 0 |
| 6 | | 1 | 1 | 0 | 1 | 0 | 0 |
| 7 | | 1 | 0 | 0 | 0 | 0 | 1 |
| 8 | | 0 | 1 | 0 | 0 | 0 | 0 |
| 9 | | 0 | 0 | 1 | 0 | 0 | 0 |
| A | | 0 | 0 | 0 | 0 | 0 | 1 |
| B | | 0 | 0 | 0 | 1 | 0 | 0 |
| C | | 0 | 0 | 0 | 0 | 1 | 0 |
| D | | 1 | 0 | 0 | 0 | 0 | 0 |
| E | | 0 | 0 | 0 | 0 | 0 | 0 |

IMAGE PROCESSING APPARATUS AND PROCESSING METHOD THEREOF

BACKGROUND OF THE INVENTION

1. Field of the Invention

The present invention relates to an image processing apparatus and a processing method thereof.

2. Description of the Related Art

Conventional image processing apparatuses that determine whether or not an image is a white image each time an image is formed and control whether or not the image from the image processing apparatus is output based on the results of the determination, are in wide use.

Such an image processing apparatus receives and analyzes page description language (PDL) data, reads an original document using an image reading apparatus, and generates image data. There are cases where such image data is generated sequentially along with accompanying information in a state in which the data is divided into, for example, block-shaped subregions. The generated subregions into which the image data has been divided undergo sequential image processing on an individual basis based on the accompanying information, and are compressed and saved into a memory. Because the image data is compressed when it is saved into the memory, it is possible to conserve space in the memory.

Conventionally, after decompressing compressed image data, whether or not the image is a single-color image, such as a white image, is determined by scanning the pixel values of the image data and determining whether or not the image data includes an object. When outputting images, control is carried out to prevent the wasteful consumption of output resources by not outputting single-color images based on the results of the aforementioned determination.

However, with the aforementioned conventional technique, whether or not a single-color image will be generated is determined by scanning the pixel values through a software process after the compressed image data has been decompressed, which has been problematic in that it leads to an increase in the processing time.

SUMMARY OF THE INVENTION

The present invention provides an image processing apparatus capable of quickly determining a single-color image from image data in a compressed state, and provides a processing method for such an image processing apparatus.

One aspect of the present invention provides an image processing apparatus that processes image data in units of blocks, each block having a predetermined number of pixels, the apparatus comprising: a calculation unit that calculates a number of pixels in the block whose pixel values are different; a specification unit that specifies a predetermined pattern for the block in accordance with the number of pixels whose pixel values are different calculated by the calculation unit and the locations of the different pixels; a compression unit that compresses the image data by outputting the pattern specified by the specification unit and the pixel values of the number of pixels whose pixel values are different; and a determination unit that determines whether the image data is composed of a single color based on the pattern and the pixel values outputted by the compression unit.

Further features of the present invention will become apparent from the following description of exemplary embodiments (with reference to the attached drawings).

DESCRIPTION OF THE EMBODIMENTS

Embodiments for carrying out the present invention will be described in detail hereinafter with reference to the drawings. In the embodiments, a digital multifunction peripheral (MFP) having multiple functions such as scanning, printing, copying, and so on will be described as an example of an image processing apparatus.

First Embodiment

Figure 1:
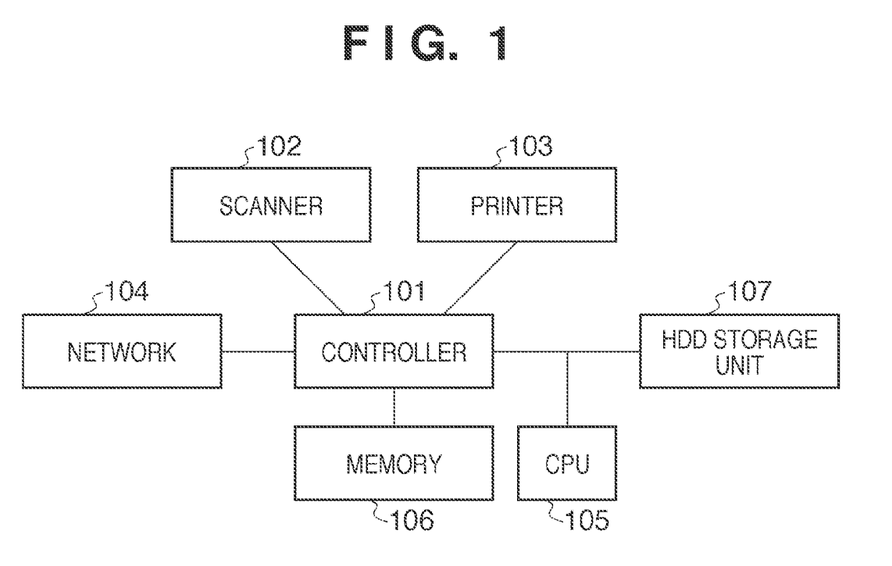
FIG. 1 is a block diagram illustrating an exemplary configuration of an image processing apparatus according to an embodiment of the present invention.

As shown in FIG. 1, a controller 101 is connected to a scanner 102 serving as an image input device, a printer 103 serving as an image output device, and so on. The controller 101 is also connected to a network 104 such as a LAN, a public line (WAN), or the like, and can therefore input/output image information, device information, and so on, as well as expand PDL data into images.

A CPU 105 is a processor that controls the MFP as a whole in accordance with programs stored in an HDD storage unit 107, which will be mentioned later. A memory 106 is a system work memory used for operations of the CPU 105, and is an image memory that temporarily stores image data. The HDD storage unit 107 is a hard disk drive that stores system software, programs, image data, and so on.

Figure 2:
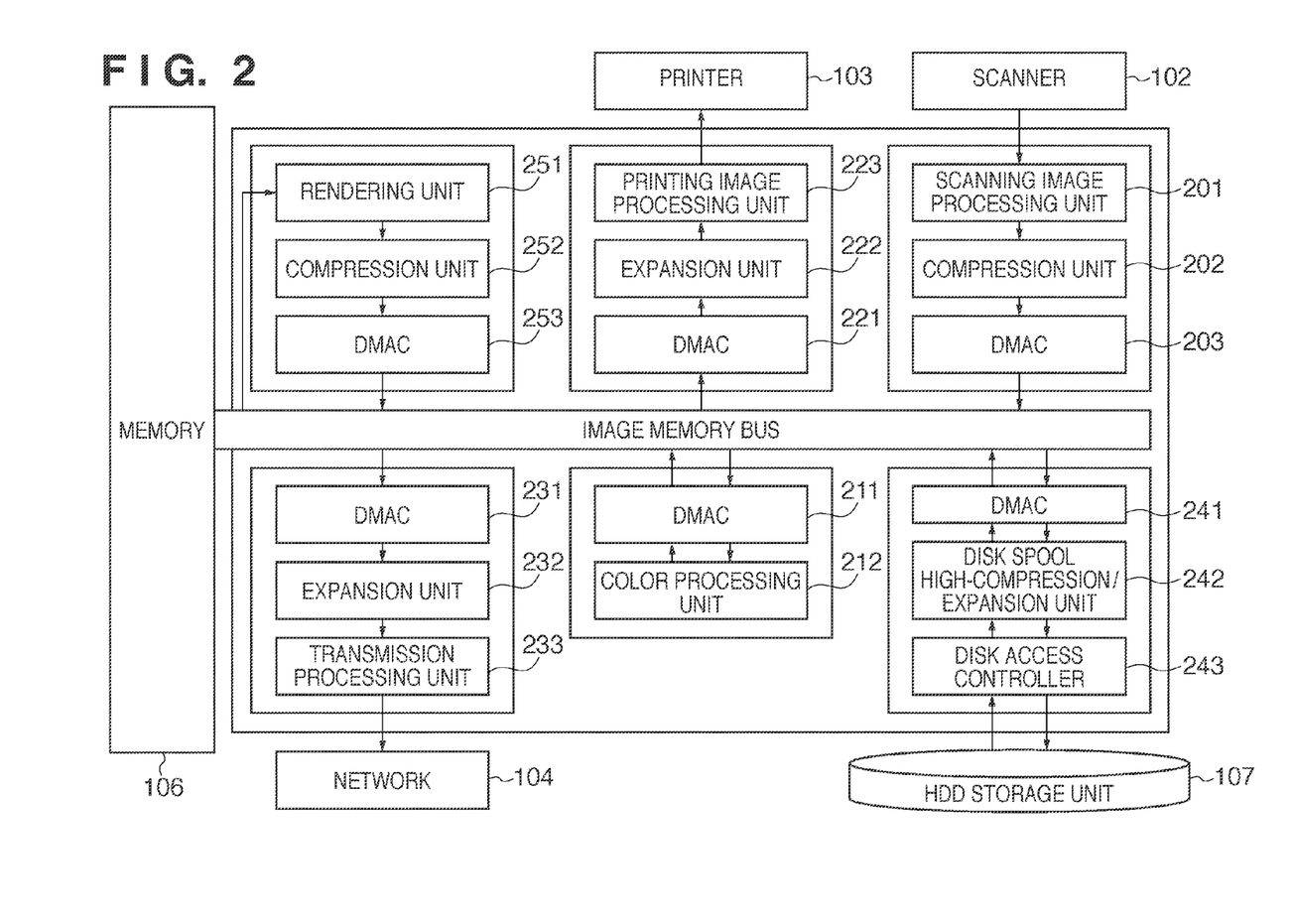
FIG. 2 is a diagram illustrating an exemplary configuration of the controller illustrated in FIG. 1.

Next, processes performed by various elements of the controller 101 will be described in detail with reference to the exemplary configuration of the controller 101 illustrated in FIG. 2. First, a situation in which image data obtained through scanning performed by the scanner 102 is imported will be described. A scanner image processing unit 201 receives three-color RGB (red, green, and blue) image data read by the scanner 102 and carries out image processing such as shading, filtering, or the like on that image data, after which a compression unit 202 carries out an image compression process on the image data. The compressed data is then stored in the memory 106 by a DMAC (Direct Memory Access Controller) 203 via an image memory bus.

Next, in the case where the scanned image data is to be printed, the compressed data stored in the memory 106 is transferred by a DMAC 211 to a color-processing unit 212 via the image memory bus. The color-processing unit 212 converts the image data into the CMYK (cyan, magenta, yellow, and black) color space. Color processes such as darkness adjustment, printer gamma correction, and so on are carried out on the respective CMYK values, after which the DMAC 211 once again stores the processed data in the memory 106 via the image memory bus. After this, in order to carry out image processing for printing, a DMAC 221 loads the compressed data stored in the memory 106 via the image memory bus, and an expansion unit 222 expands the image data into raster image data. The CMYK raster image data is then input into a printing image processing unit 223, which carries out area gradation processing through dithering, error diffusion, or the like and outputs the processed data to the printer 103.

Next, in the case where the scanned image data is to be transmitted over the network, the compressed data stored in the memory 106 is transferred by the DMAC 211 to the color-processing unit 212 via the image memory bus. Then, after the color-processing unit 212 has carried out display gamma adjustment, paper ground color adjustment, and so on, the image data is converted into the YCbCr (luminosity, blue color difference, and red color difference) color space. The DMAC 211 then once again stores the image data in the memory 106 via the image memory bus. After this, in order to carry out image processing for transmission, a DMAC 231 transfers the compressed data stored in the memory 106 to an expansion unit 232 via the image memory bus. The expansion unit 232 expands the compressed data into raster image data. After this, if a transmission processing unit 233 is to transmit the YCbCr raster image data as a color image, the transmission processing unit 233 carries out a JPEG compression process thereon, whereas if the raster image data is to be transmitted as a binary monochromatic image, the transmission processing unit 233 binarizes the Y data and carries out JBIG compression or the like thereon; the processed data is then output to the network 104.

Next, in the case where the scanned image data is to be saved, the compressed data stored in the memory 106 is transferred by a DMAC 241 to a disk spool high-compression/expansion unit 242 via the image memory bus. The disk spool high-compression/expansion unit 242 has a slower HDD write speed relative to the memory, and thus a higher-compression JPEG compression is carried out. After this, the compressed data is saved in the HDD storage unit 107 via a disk access controller 243. Meanwhile, in the case where the compressed data saved in the HDD storage unit 107 is once again to be transferred to the memory 106, the aforementioned processing may be carried out in reverse.

Here, a situation in which the PDL data sent over the network 104 as illustrated in FIG. 1 is written into the memory 106 will be described. Although a PDL analysis unit is not shown in FIG. 2, the CPU 105, functioning as a PDL analysis unit, analyzes the PDL data and outputs a display list, which is a result of the analysis, to the memory 106. After this, a rendering unit 251 renders the display list stored in the memory 106 into raster RGB image data, and a compression unit 252 carries out an image compression process. The compressed data is then stored in the memory 106 by a DMAC 253 via the image memory bus.

Note that processes for printing or saving the PDL data or transmitting the PDL data over a network can be realized by carrying out a process similar to that that is carried out for the scanned image data.

Next, a process for compressing raster image data, which is a characteristic of the present invention, will be described in detail. First, 2×2 pixel blocks are extracted from raster image data that is in page units, and the compression process is carried out on the data using the extracted blocks as units.

Figure 3:
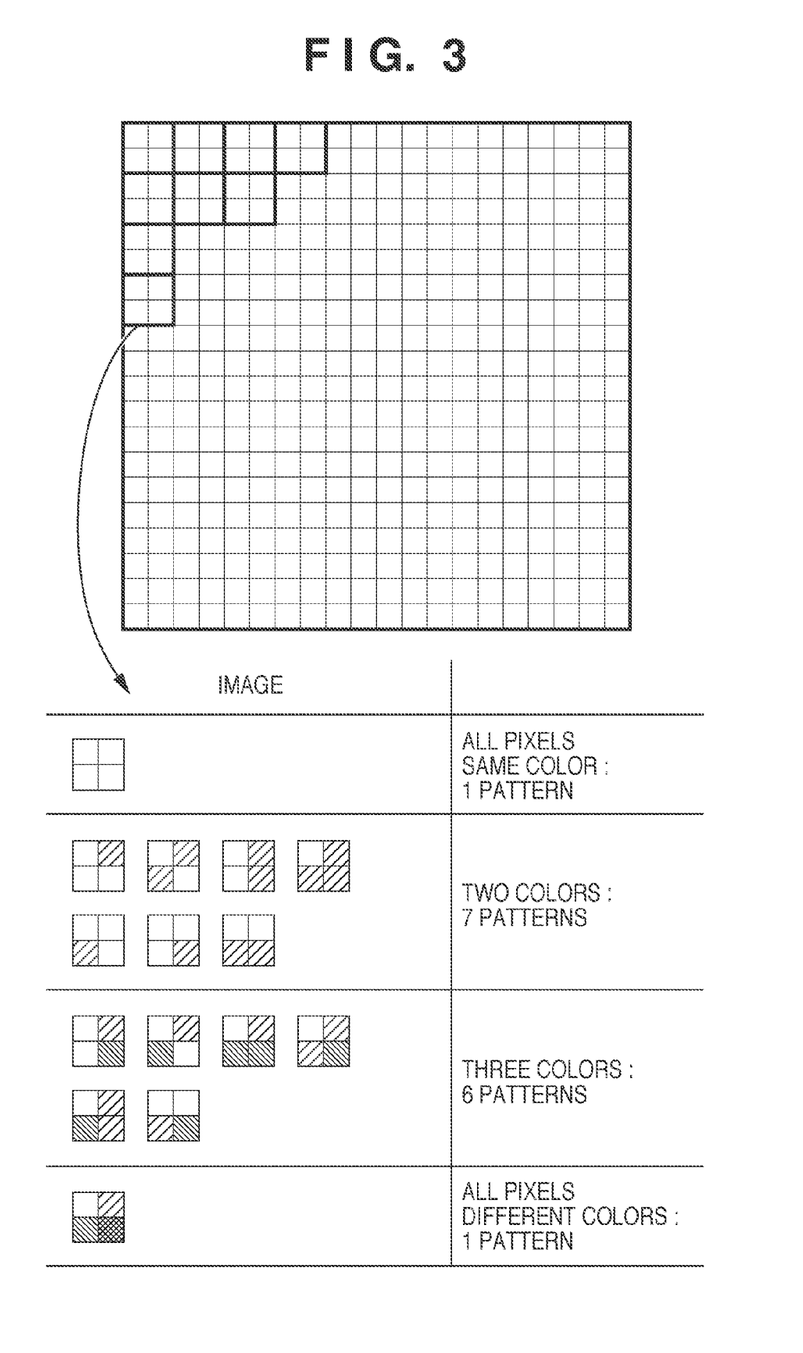
FIG. 3 is a diagram illustrating the number of possible combinations of four-color patterns in 2×2 pixel blocks.

Here, before describing the compression process, the number of combinations of the number of colors that can exist in data of 2×2 pixels, or four pixels, will be considered. Because the number of pixels is four, a maximum of four colors can exist therein, and thus, at most, only combinations of one to four colors can exist within a block. The number of possible combinations of four-color patterns is illustrated in FIG. 3.

First, in the case where there is only one color within the block, all four pixels are composed of the same color, and thus there is only one combination. Next, the case where there are two colors within the block will be considered. As shown in FIG. 3, in the case where two colors are laid out in the four pixels, assuming that the pixel in the upper-left is a first color and the other pixels are a second color, either the first color or the second color can exist in the remaining three pixels aside from the pixel in the upper-left, and thus a total of seven combinations can be considered outside of the case where all four pixels have the same color.

Next, the case where there are three colors within the block will be considered. In the case where three colors are laid out in the four pixels, it can be said that of the three colors, only one color is used twice, and thus the number of combinations in this case can be found by finding the number of cases in which two of the four pixels have the same color. In other words, the number of combinations in the case of three colors is equivalent to combinations of two coordinates from the four coordinates, resulting in a total of six. Finally, in the case where four colors are present within the block, only one pattern exists, as is the case when only one color is present in the block.

Finding the total number of combinations for one to four colors results in a total of 15 patterns. If providing a flag for identifying all of these patterns is taken into consideration, a data amount of four bits will be necessary. The relationships between these 15 patterns and flags are illustrated in FIG. 4, and these flags will be referred to as "pattern flags" hereinafter.

Figure 5:
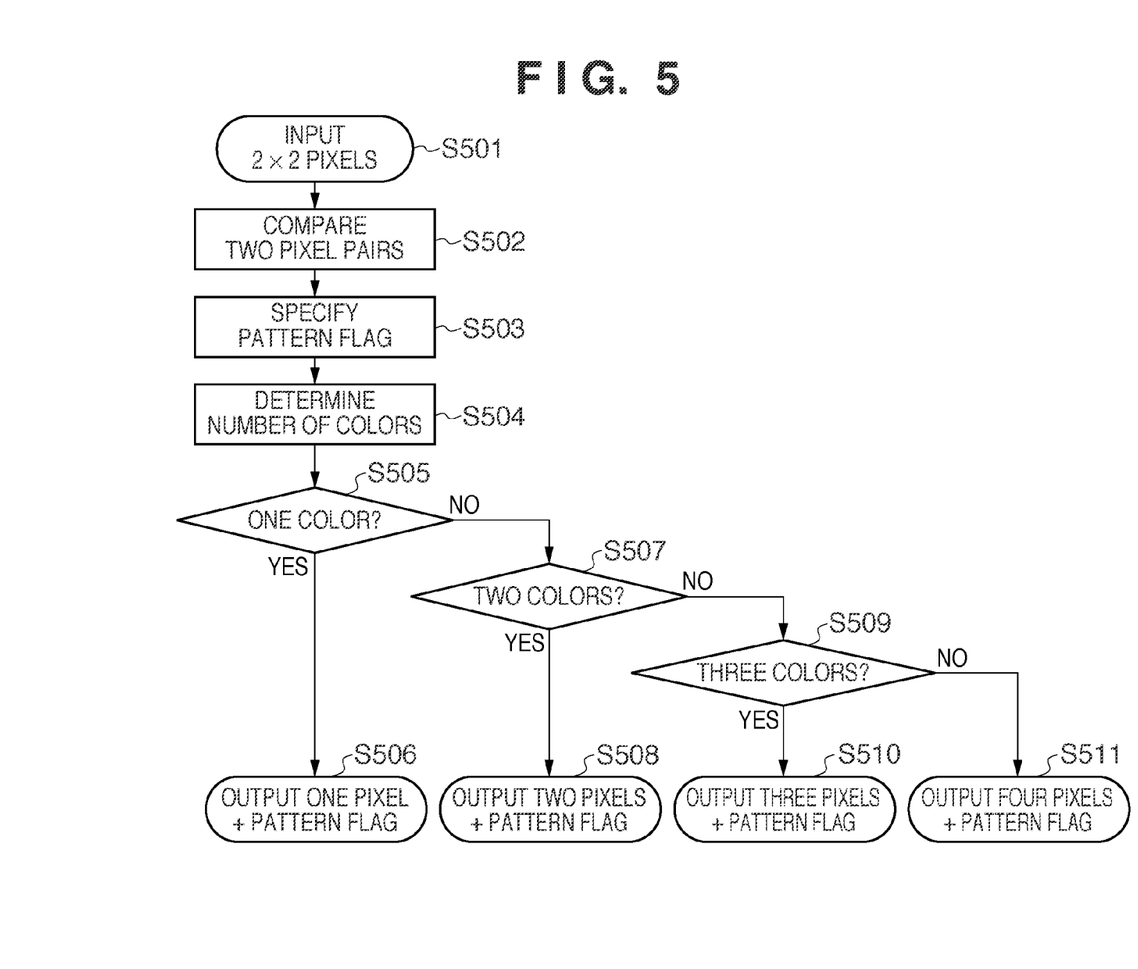
FIG. 5 is a flowchart illustrating a process for specifying different numbers of pixels and pattern flags.

As described above, the processes carried out by the compression units 202 and 252 will be described using FIG. 5, in consideration of the possible combinations that the 2×2 pixel blocks can take on. The input will be described as an image in which, for example, each RGB signal is 8-bit with 256 tones and the data is 8-bit dot-sequential data, resulting in 24 bits per pixel.

First, a 2×2 pixel block is inputted (S501), and 24-bit comparisons are obtained for all of the two-pixel combinations in that block (S502). If the result of the comparison indicates that all of the bits match, "1" is output, whereas if the bits do not match, "0" is output.

Figure 4:
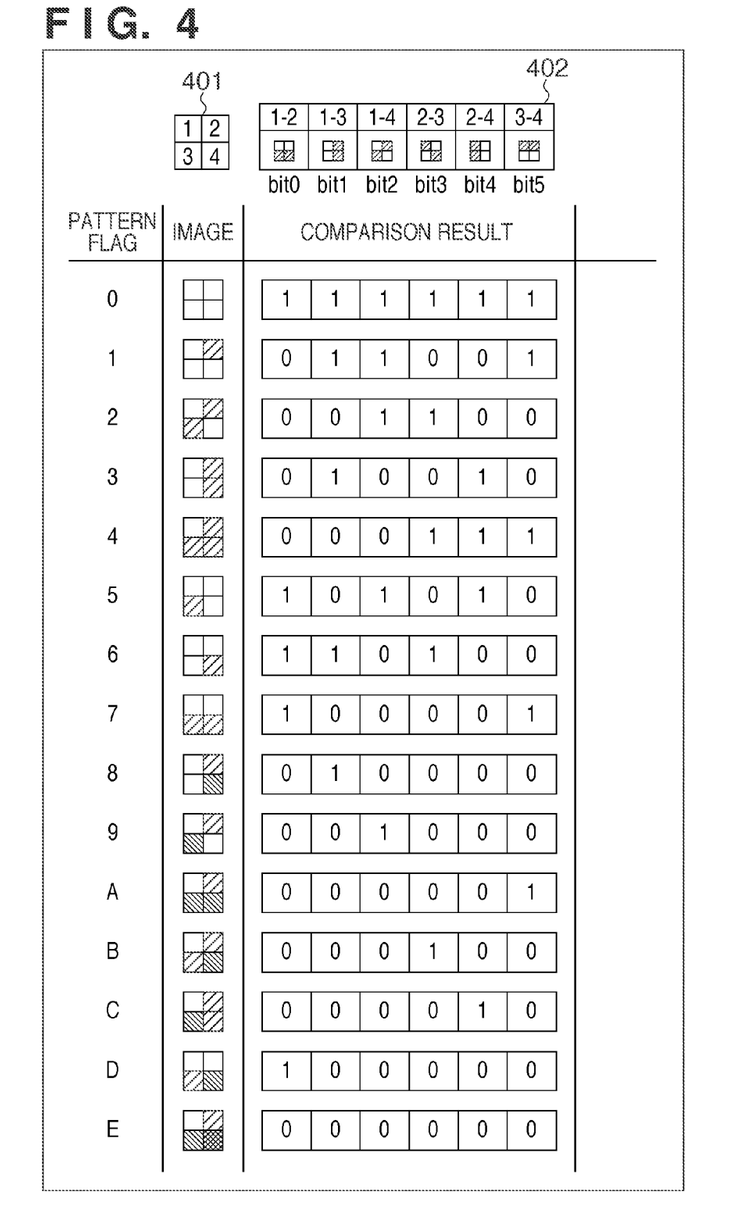
FIG. 4 is a diagram illustrating relationships between the patterns illustrated in FIG. 3 and pattern flags.

Here, assume that coordinates of 1, 2, 3, and 4 are assigned to the 2×2 pixels in order starting with the upper-left and moving to the upper-right, then to the lower-left, and to the lower-right (indicated by 401 in FIG. 4). Because there is a total of six two-pixel pairs, or 1-2, 1-3, 1-4, 2-3, 2-4, and 3-4 (indicated by 402 in FIG. 4), it is necessary to make six comparisons, and thus 6 bits are output as a result. As indicated by the comparison results shown in FIG. 4, if all the pixels are the same color, 1 is output for all of the comparison results, whereas if the four pixels all have different pixel values, 0 is output for all of the comparison results.

In this example, the number of patterns that can appear based on the matching of colors in the four pixels is 15, and thus as shown in FIG. 4, a four-bit pattern flag is specified in accordance with the six-bit comparison result (S503). When the four-bit pattern flag has been specified, the number of colors that have appeared in the four pixels and the color data are extracted (S504). Then, the number of colors in the input block is determined (S505, S507, and S509). Here, the determination is carried out by finding what locations the second and subsequent colors are in assuming that the upper-left has been taken as the first color, based on the pattern flag. This determination process will be described using FIG. 6.

Figure 6:
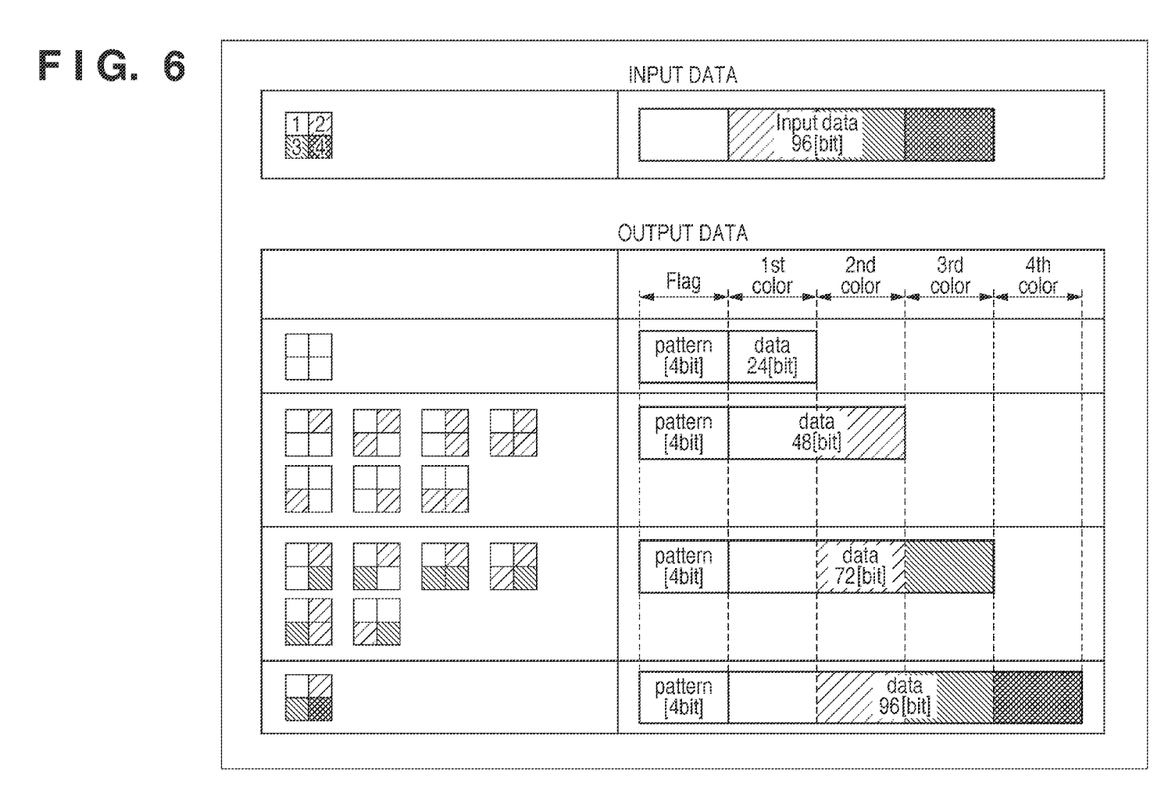
FIG. 6 is a diagram illustrating a process for determining the locations of pixels having different pixel values.

As illustrated in FIG. 6, in the case where, for example, it has been confirmed that the four pixels are composed of a single color, the second and subsequent colors are not present, and thus the four-bit pattern flag and the pixels of the first color (24 bits) are output (S506). However, in the case where it has been confirmed that the four pixels are composed of two colors (YES in S507), the coordinates of those two colors are calculated based on the pattern flag, and the four-bit pattern flag and the 48-bit pixel values of the two colors are output (S508). Meanwhile, in the case of three colors (YES in S509), the four-bit pattern flag and the 72-bit pixel values of the three colors are output (S510). In the case of four colors (NO in S509), the four-bit pattern flag and the 96-bit pixel values of the four colors are output (S511). At this time, the color data that has not appeared thus far is stored in order by the coordinates within the block (that is, 1, 2, 3, and 4, in order from the upper-left, to the upper-right, then to the lower-left, and finally the lower-right).

In this manner, the output data amount can be reduced through a comparatively simple process by outputting the input data of four colors (96 bits) within the 2×2 pixel block as a four-bit pattern flag and the pixel values of only the number of colors present therein. Conversely, by referring to the pattern flags, the number of colors present in the block can be specified. Data compression can thus be carried out on the entire image by performing such a process on all of the image blocks.

Figure 7:
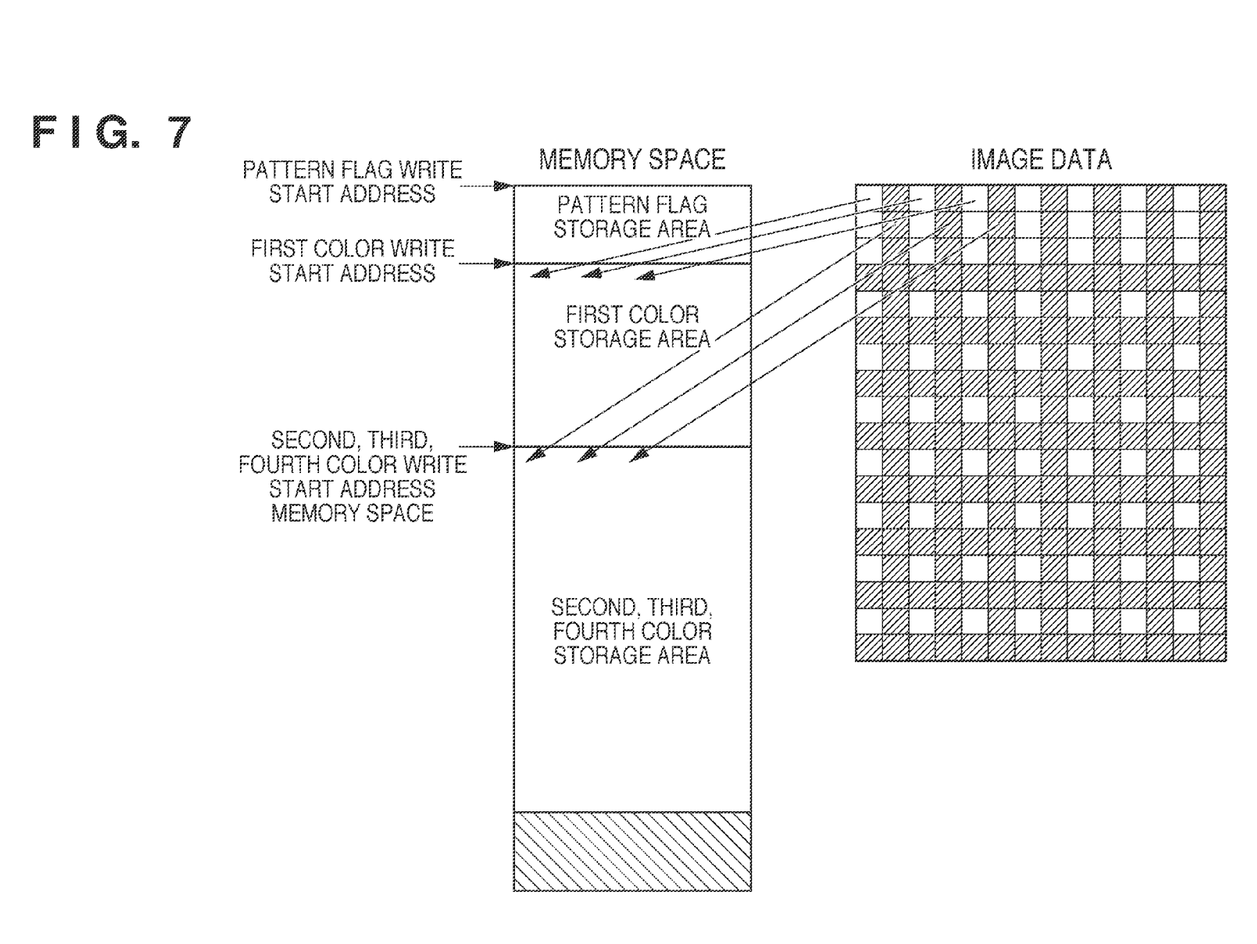
FIG. 7 is a diagram illustrating an example of the writing of image data into a memory space by a DMAC.

A DMAC writes the pattern flags and color data found in this manner into the memory, but at that time, the DMAC changes the write position of the pattern flag and the first color data, and the second, third, and fourth color data. In the DMAC, three addresses, or the starting memory address for writing the pattern flag, the starting memory address for writing the first color data, and the starting memory address for writing the second and subsequent color data, are specified.

FIG. 7 is a diagram illustrating an example of the writing of the image data into a memory space by the DMAC. Note that in the case where an image in which each color of R, G, and B are 8 bits and the size of the image is M×N, the data size of the pattern flag is M×N/8 bytes. Furthermore, the data size of the first color is M×N×¾, but the data sizes of the second color, the third color, and the fourth color are variable depending on the image (that is, have different sizes depending on the image).

Here, with respect to the memory regions that follow the write position of the first color, the storage in those regions is carried out without the pixel data being quantized, encoded, or the like at the pixel level. In other words, it is possible to determine what pixel values the compressed image data is composed of by referring to the pattern flags and the pixel data.

Figure 8:
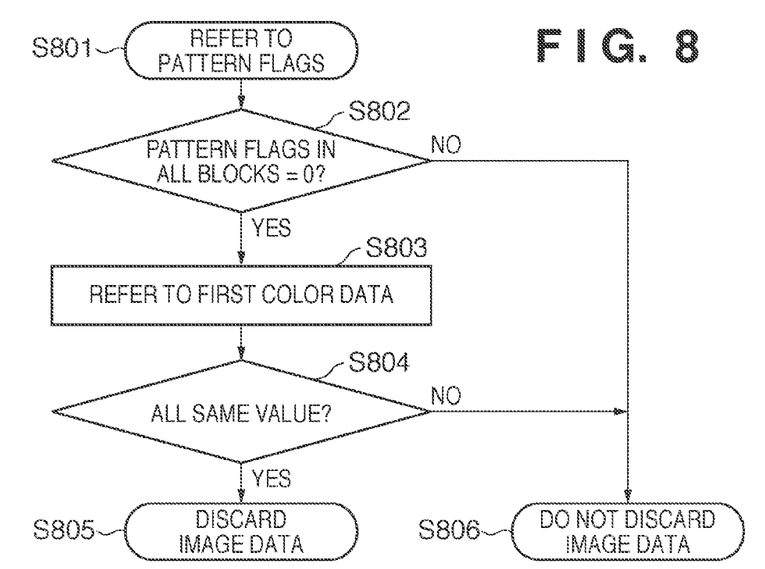
FIG. 8 is a flowchart illustrating a process for determining a single-color image according to a first embodiment.

Next, a single-color image determination process according to the first embodiment will be described using FIG. 8. First, the CPU 105 refers to the various pattern flags in the pattern flag region of the compressed image data stored in the memory 106 (S801), and determines whether or not all of the pattern flags are "0" (S802). In the case where it has been determined in S802 that all of the pattern flags are "0", the CPU 105 refers to the data region of the first color (S803) and determines whether the values in the first color data are all the same value (S804). In the case where the result of the determination indicates that all of the data values of the first color are the same value, it is determined that the image data is single-color image data in which the entire image is composed of the same pixel value, and thus the image data in the memory 106 is discarded (S805). On the other hand, if the data values of the first color are different, it is determined in S804 that the image data is not single-color image data, and the image data in the memory 106 is not discarded (S806).

Meanwhile, in the case where it has been determined in the aforementioned S802 that all the pattern flags are not "0", the CPU 105 determines that the image data is not single-color image data, and thus the image data in the memory 106 is not discarded (S806).

Next, the expansion units 222 and 232, which form pairs with the compression units 202 and 252 respectively, will be described. Note that the expansion units 222 and 232 handle processes for restoring the pattern flags and pixel data described above into raster image data. Three addresses, or the pattern flag write start address, the first color write start address, and the second, third, and fourth color write start address of the compressed data arranged in the memory 106 as illustrated in FIG. 7, are specified to the DMACs 221 and 231. The DMACs 221 and 231 read out the data from the three addresses and transfer that data to the expansion units 222 and 232.

First, the expansion units 222 and 232 analyze the four-bit pattern flag, and calculate the number of colors within that block. The second, third, and fourth color data are read out in addition to the first color data depending on the number of colors, and the pixel data is rearranged in accordance with the form of the pattern flag. The 2×2 pixel block is expanded and decoded through this processing.

Meanwhile, in the case where the image size is to be reduced by half by the expansion units 222 and 232, the pattern flag and the second, third, and fourth color data are not necessary, as described above; accordingly, only the first color write start address is specified for the DMACs 221 and 231. Through this, only the first color data is loaded from the memory 106, and the image is configured thus. Performing the processing in this manner makes it possible to conserve bandwidth in the memory bus.

According to the first embodiment, whether an image is a single-color image can be determined and the load of the decompression processing reduced using compressed image data that has been compressed using a comparatively simple compression technique. As a result, when transmitting the image data over a network, it can be determined whether the image data expresses a single-color image, such as an image of white paper, while the image is in a compressed state, which makes it possible to discard image data that has been determined to be a single-color image and thus prevent wasteful data transmission. Furthermore, by adding, for example, a determination as to whether the first color is white, a determination as to whether the image data is image data of white paper can be carried out while the image data is in a compressed state.

Although a 2×2 block was described in the first embodiment as being the minimum unit, it should be noted that the present invention is not limited thereto. Furthermore, although the image data was described as 8-bit RGB data in the descriptions of the compression, data in the CMYK color space, grayscale data, or pixel values aside from 8 bits may also be employed as well.

Second Embodiment

Next, a second embodiment according to the present invention will be described in detail with reference to the drawings. As in the first embodiment, the second embodiment describes an MFP as an example of the image processing apparatus. The second embodiment will describe a different determination method for the case in which the single-color image determination method according to the first embodiment is applied to scanned image data.

In the first embodiment, an image that can be expected to be a single-color image is an image having many regions in which adjacent pixel levels do not differ by even a single level. In other words, raster image data that has been rendered as high-definition PDL data can often be expected to be this kind of image, but with an image that has been inputted through scanning, noise components from the scanner are superimposed on the image, resulting in several levels of differences from the normal pixel values. In such a case, there are situations where 2×2 pixel blocks in compressed data are not determined to be a single color.

Figure 9:
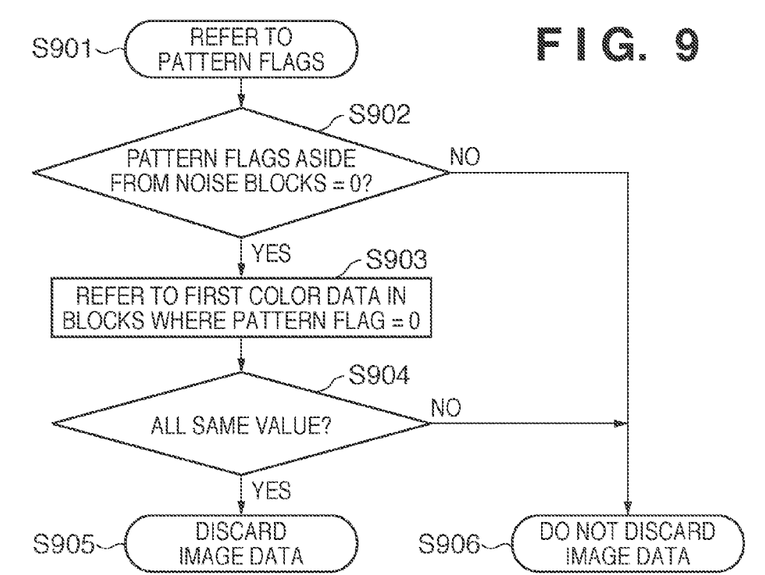
FIG. 9 is a flowchart illustrating a process for determining a single-color image according to a second embodiment.

Accordingly, in the second embodiment, a determination method in which noise from the scanner in the scanned image data is taken into consideration in the single-color image determination method described in the first embodiment will be described using FIG. 9.

First, the CPU 105 stores, in advance, which blocks of the overall image noise has occurred in in the memory 106 as a noise block number. Then, the CPU 105 references the pattern flags from the pattern flag region of the compressed image data stored in the memory 106 (S901). Next, the CPU 105 determines whether or not the pattern flags of a block number obtained by subtracting the number of noise blocks from the number of blocks in the overall image are "0" (S902). Here, in the case where it has been determined that the pattern flags for a number of blocks that is greater than or equal to the number of blocks obtained by subtracting the number of noise blocks from the number of blocks in the overall image are "0", the CPU 105 advances the processing to S903.

In S903, the CPU 105 refers to the first color data region, and determines whether the values of the first color data in the blocks in which the pattern flag is "0" are all the same value (S904). Here, in the case where all of the data values of the first color are the same value, the CPU 105 determines that the image data is single-color image data in which the entire image is composed of the same pixel value, and thus the image data in the memory 106 is discarded (S905). On the other hand, in the case where it is determined in S904 that the values of the first color data differ, the CPU 105 determines that the image data is not single-color image data, and the image data in the memory 106 is not discarded (S906).

However, in the case where it has been determined in the aforementioned 5902 that the number of pattern flags that are not "0" is greater than or equal to the number of noise blocks, the CPU 105 determines that the image data is not single-color image data, and thus the image data in the memory 106 is not discarded (S906).

According to the second embodiment, it is possible to carry out a determination properly even for images for which the single-color image determination is difficult due to noise, as represented by scanned images.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-296378, filed Dec. 25, 2009 which is hereby incorporated by reference herein in its entirety.

What is claimed is:

1. An image processing apparatus that processes image data in units of blocks, each block having a predetermined number of pixels, the apparatus comprising:
   a calculation unit that calculates a number of pixels in the block whose pixel values are different;
   a specification unit that specifies a predetermined pattern for the block in accordance with the number of pixels whose pixel values are different calculated by the calculation unit and the locations of the different pixels;
   a compression unit that compresses the image data by outputting the pattern specified by the specification unit and the pixel values of the number of pixels whose pixel values are different; and
   a determination unit that determines whether the image data is composed of a single color based on the pattern and the pixel values outputted by the compression unit.

2. The apparatus according to claim 1, wherein the determination unit determines that the image data is composed of a single color and discards the single-color image data in the case where the patterns output for all of the blocks are the same and the output pixel values are all the same value.

3. The apparatus according to claim 1, wherein the determination unit determines that the image data is composed of a single color in the case where the patterns output for a specific block are the same and the output pixel values are all the same value.

4. A processing method for an image processing apparatus that processes image data in units of blocks, each block having a predetermined number of pixels, the method comprising:
   calculating a number of pixels in the block whose pixel values are different;
   specifying a predetermined pattern for the block in accordance with the number of pixels whose pixel values are different calculated in the step of calculating and the locations of the different pixels;
   compressing the image data by outputting the pattern specified in the step of specifying and the pixel values of the pixels whose pixel values are different; and
   determining whether the image data is composed of a single color based on the pattern and the pixel values outputted in the step of compressing.

5. A program stored on a computer-readable recording medium, the program causing a computer to execute the processing method according to claim 4.

* * * * *